United States Patent [19]

Blenkush

[11] Patent Number: 4,500,118
[45] Date of Patent: Feb. 19, 1985

[54] FITTING APPARATUS FOR SOFT TUBING

[75] Inventor: Brian J. Blenkush, Maple Grove, Minn.

[73] Assignee: Colder Products Company, St. Paul, Minn.

[21] Appl. No.: 454,562

[22] Filed: Dec. 30, 1982

[51] Int. Cl.³ .................. F16L 33/00; F16L 33/16; F16L 25/00
[52] U.S. Cl. .................... 285/247; 285/104; 285/386; 285/421; 285/423
[58] Field of Search ............. 285/247, 246, 245, 260, 285/423, 421, 104, 386, 95

[56] References Cited

U.S. PATENT DOCUMENTS

| | | |
|---|---|---|
| 792,626 | 6/1905 | Stephans .......................... 285/246 |
| 863,745 | 8/1907 | Nelson . |
| 1,171,551 | 2/1916 | Stephens . |
| 2,333,612 | 11/1943 | Zimmer . |
| 2,382,010 | 8/1945 | Miller . |
| 2,940,778 | 6/1960 | Kaiser . |
| 3,222,091 | 12/1965 | Marshall . |
| 3,226,137 | 12/1965 | Trnka . |
| 3,381,982 | 5/1968 | Elek ............................ 285/247 X |
| 3,393,267 | 7/1968 | Busse . |
| 3,918,679 | 11/1975 | Silvana . |
| 3,957,293 | 5/1976 | Rodgers . |
| 4,157,843 | 6/1979 | Trnka . |

FOREIGN PATENT DOCUMENTS

| | | | |
|---|---|---|---|
| 255612 | 5/1963 | Australia ........................ | 285/247 |
| 259616 | 10/1963 | Australia ........................ | 285/247 |
| 648879 | 9/1962 | Canada ........................... | 285/247 |
| 719279 | 2/1932 | France ........................... | 285/247 |

OTHER PUBLICATIONS

Brochure entitled "Gra-Tec".
Brochure entitled "Parker".
Brochure entitled "Jaco".

Primary Examiner—Richard J. Scanlan, Jr.
Attorney, Agent, or Firm—Merchant, Gould, Smith, Edell, Welter & Schmidt

[57] ABSTRACT

A fitting (30) for use with soft tubing (40) is disclosed. The fitting includes a threaded female member (36) defining an aperture for insertion therethrough of the tubing. The fitting further includes a male member (32) defining a generally tubular portion (46) adapted for insertion into the end of the tubing. The male member includes a radially extending flange for preventing the insertion of tubular portion into the tubing beyond a predetermined distance. The male member is further threaded for threading onto the female member. A sliding mandrel (48) is positioned on the tubular portion for axial movement thereof. The female member includes a generally inwardly projecting collar portion (64) for engaging the outer surface of the tubing, the collar portion cooperating with the sliding mandrel to maintain the tubing in the fitting when a tensile pull is exerted on the tubing.

17 Claims, 8 Drawing Figures

FITTING APPARATUS FOR SOFT TUBING

BACKGROUND OF THE INVENTION

The present invention relates to a fitting for soft tubing such as polyvinylchloride (PVC) tubing. More particularly, the present invention relates to a fitting including a sliding mandrel over which the tubing is inserted, the sliding mandrel providing a dynamic sealing wedge between the fitting and the tubing.

Soft tubing has been known for many years. While soft tubing is made from many different materials, such as polyvinylchloride (PVC), one of the most well known trade brands of soft tubing is TYGON (a trademark of the Norton Company) tubing. Today, TYGON tubing as well as other soft tubing is sold extensively throughout the world for many applications such as food, chemical, and medical industries, where its clarity, compatibility, chemical resistance, and extreme flexibility are particularly advantageous. There is a substantial need for a fitting particularly adapted for use with soft tubing or the like and which is easy to use.

Tubing fittings have long been known for rigid and semi-rigid tubing. Oftentimes, the fittings have been designed for rigid tubing, e.g. metal tubing, and adapted to semi-rigid tubing, e.g. plastic and nylon tubing. These tubing fittings are generally considered as a "ferruled" style tubing fitting which includes a fitting body that has specific contours for the ferrule seat, a particular ferrule that is designed to grip or seal on the outside of the tubing, and a nut portion to activate the ferrule action.

Other tubing fitting styles, including compression fittings, flared tubing fittings, etc., originally designed for use with rigid tubing, have been adapted for use with semi-rigid tubing.

However, none of these tubing fittings have been designed for reliable use with soft tubing such as TYGON tubing. Attempts have been to adapt such fittings for soft tubing by using an adaptor sleeve inserted inside the soft tubing so as to provide the soft tubing with some rigidity for the ferrule design to seal on the outside of the tubing.

Another type of fitting currently used with soft tubing is the "barbed" fitting. These fittings include a generally tubular portion having barbs or serrations on the outer surface, the tubular portion being adapted for insertion a limited distance into the end of the tubing. Consequently, the barbed fittings provide a gripping action when the tube is compressed by insertion over the barbs. The soft tubing is normally further compressed over the barb using a clamp to compress the tubing onto the barbed fitting.

Currently available ferruled and barbed fittings are not reliable for use with soft tubing. One reason for this is the unique characteristic of soft, flexible tubing which allows the cross section to reduce or become narrower as tensile pull is exerted on the tubing due to pressure inside the tubing or an external force being physically applied by a pull on the tubing. Conventional ferruled fittings will not reliably hold the tubing because the ferrule is gripping the tubing outside diameter which decreases in size as the tube is stretched. Barbed type fittings rely on the clamp being tightened so as to stretch or squeeze the tubing over the barbs so as to not allow additional stretch of the tubing. The clamp must be installed manually and additional tools and space for installation are frequently required in an effort to adequately stretch the tubing such that it is held in place by the clamp. Due to this and other differences between soft, flexible tubing and rigid or semi-rigid tubing, the standard ferruled fittings and barbed fittings currently available when utilized with soft, flexible tubing provide less than reliable results.

Couplings for large diameter hoses, such as fire hoses, have been developed which are responsive to pressure changes in the fluid, e.g. water. For example, U.S. Pat. Nos. 3,222,091; 3,226,137; 2,940,778; and 4,157,843 disclose various types of large diameter hose couplings and menders having axially slideable members responsive to water pressure changes. However, in addition to many other problems and differences, these couplings are not adaptable for soft tubing use. The large hose couplings do not lend themselves to miniaturization as required for most soft tubing applications. Furthermore, they have a rather complicated structure with several interrelated working parts. Accordingly, they appear difficult to assemble and rather expensive to manufacture.

Also, the walls of large diameter hoses do not undergo a substantial reduction in thickness that soft tubing does when subjected to a tensile pull. The hose couplings disclosed do not provide for the concentration of a wedging force. If it were possible to adapt these couplings to soft tubing, as with other coupling for rigid and semi-rigid tubing, the soft tubing would pull out from the couplings when subjected to sufficient tensile pull.

The present invention solves these and many other problems associated with currently available fittings.

SUMMARY OF THE INVENTION

The present invention relates to a fitting for use with soft tubing. The present invention includes a threaded female member defining an aperture for insertion therethrough of the tubing. The fitting further includes a male member defining a generally tubular portion adapted for insertion into the end of the tubing. The male member includes a radially extending flange means for preventing the insertion of said tubular portion into the tubing beyond a predetermined distance. The male member is also threaded for threading onto the female member. A sliding mandrel is positioned on the tubular portion for axial movement of the tubular portion. The female member includes a generally inwardly projecting collar portion for engaging the outer surface of the tubing, the collar portion cooperating with the sliding mandrel to retain the tubing in the fitting when a tensile pull is exerted on the tubing.

In one embodiment of the present invention, the fitting includes a housing or body portion and a nut portion. The nut and body portion are threaded along a partial extend thereof such that the nut portion may be threaded onto the body portion. The body portion includes an axially sliding member adapted for at least partial insertion into the inside of the tubing. The fitting is assembled by sliding the nut over the tubing and the end of the tubing partially onto the body portion, including the sliding collar member. The nut is then threaded onto the body portion. The nut includes a collar portion which extends generally radially inward. As tensile pull is exerted on the tubing due to pressure inside the tubing or a force being externally applied by pulling on the end of the tubing, the axially sliding member will move axially toward the nut portion so as to provide a dynamic wedge between the collar portion of the nut and the tubing thereby preventing the tubing from being pulled out of the fitting.

A particularly advantageous feature of the present invention is that the fitting will not allow flexible soft tubing to pull out of the fitting when the walls of the tubing are reduced in cross section or thickness due to tensile pull being exerted on the tubing.

In one embodiment of the present invention, the inwardly projecting collar portion of the female member defines a surface which is substantially perpendicular to the longitudinal axis of the fitting and further defines a surface generally parallel to the longitudinal axis. The inner section of the surfaces define a relatively sharp corner portion. When a tensile pull is exerted on the tubing such that the tubing is pulled away from the fitting, the sharpened corner portion grips the tubing surface such that as the axially slideably collar portion slides in the direction of tubing pull, the tubing is bunched up on an inside cavity of the nut. Consequently, the greater the tensile force exerted on the tubing, the greater the wedging effect of the fitting apparatus of the present invention.

A further advantage of the present invention is the relatively small size of the fitting. The fitting, due to its configuration, aids in maximizing fluid flow therethrough. Consequently, utilized with relatively small diameter tubing, the fitting of the present invention may be sized accordingly and need not be disproportionate to the overall tubing diameter. Not only is this aesthetically appealing, but oftentimes is necessary due to space requirements.

Furthermore, the present invention requires minimum space for installation due to the fact that the nut portion of the fitting may be threaded onto the body portion without the use of any tool. For example, space for maneuvering such tools as a wrench, pliers, screw drivers, etc. is not required.

Additionally, the fitting of the present invention may be made from a variety of materials, e.g. high density polyethylene, acetyl plastic, polycarbonate, and various metals such as brass, stainless steel, aluminum, etc. Consequently, the fitting of the present invention is adaptable to a variety of environments and applications. Furthermore, the present invention, due to its configuration, lends itself to being made by conventional injection molding processes.

In one embodiment of the present invention the axially sliding member is easily fitted onto the body portion of the fitting by simply snap fitting the sliding member into place over the end of the body portion. In use, the user only has two parts to assemble when making a connection and this is readily and easily done without the necessity for any tools by simply threading the nut onto the body of the fitting.

The present invention is relatively inexpensive to manufacture and reduces the number of parts required, thereby reducing the overall cost of the fitting. There are both labor and material cost savings over conventional hose clamp fittings.

Furthermore, the tube fitting of the present invention is completely reusable as no damage is done to the fitting during make-up, take-apart, and remake of the fitting. This compares with currently available fittings which can only be used once or reused a very limited number of times.

In addition, the tube fitting of the present invention provides a two piece fitting assembly which effectuates a fluid-tight seal as well as the retention of the tubing even when the tubing is forced generally away from the fitting.

The above described features and advantages along with various other advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

DETAILED DESCRIPTION OF A PREFERRED EMBODIMENT OF THE PRESENT INVENTION

Figure 1:
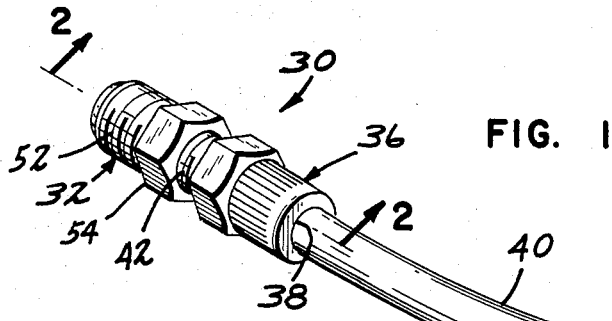
FIG. 1 is a view in perspective of a preferred embodiment of the present invention.
Figure 2:
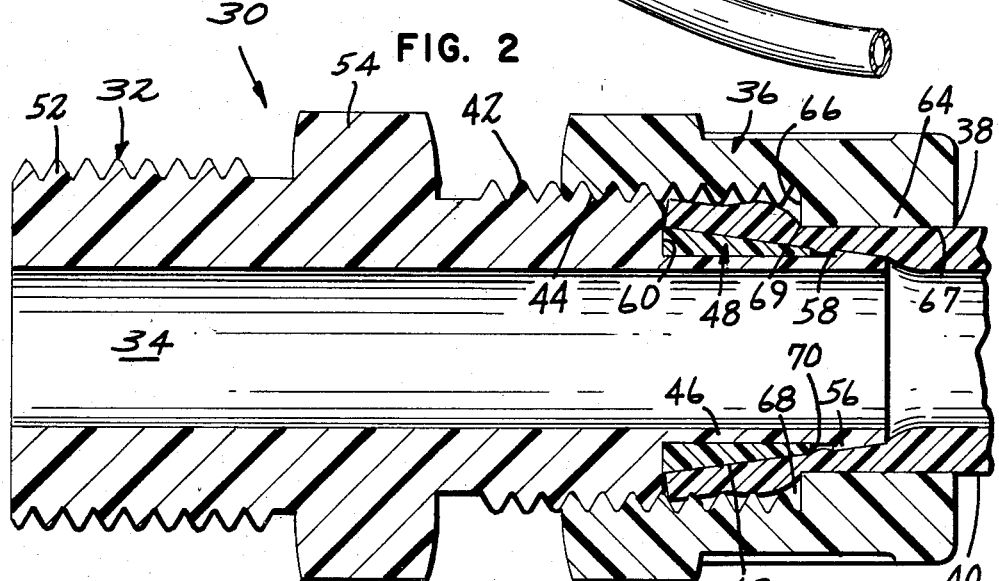
FIG. 2 is a view along lines 2—2 in FIG. 1.
Figure 3:
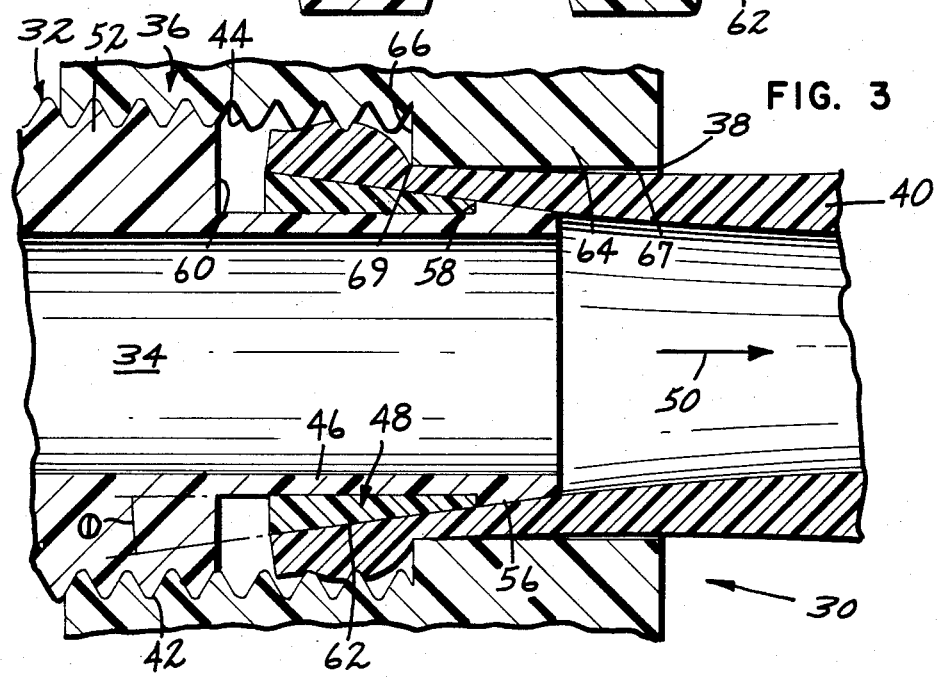
FIG. 3 is an enlarged fragmentary cross sectional view similar to FIG. 2 with the elements in a different position.

Referring now to the drawings, there is shown in FIG. 1 a preferred embodiment of the fitting apparatus of the present invention, generally designated by the reference numeral 30. As illustrated in FIGS. 1 and 2, the fitting apparatus 30 includes a body portion 32 defining a generally tubular bore or fluid flow path 34 so as to enable the flow of fluid therethrough. The preferred embodiment of the fitting apparatus 30 is further illustrated as including a nut portion 36 similarly defining a bore 38 for the insertion of a tubing 40 therethrough. As illustrated in FIG. 2, the body portion 32 includes a threaded portion 42 about the circumference thereof which cooperates with a threaded portion 44 of the nut portion 36 to provide a threaded connection therebetween. Furthermore, the body portion 32 includes a generally tubular end portion 46, of lesser diameter than the threaded portion 42, which has an axially sliding collar member or mandrel 48. As illustrated in FIGS. 2 and 3, the tubing 40 is inserted over the tubular portion 46 of the body portion 32 such that the collar member 48 is positioned at least partially, preferably entirely, on the inside of the tubing 40. As illustrated in FIG. 3, when there is fluid pressure in the fluid line 40 due to fluid flow as generally indicated by an arrow 50. (for purposes of this specification, the direction the arrow points will be referred to as the downstream direction while the opposite direction is referred to as the upstream direction) the fluid pressure exerts a tensile pull on the tubing pulling the collar member 48 in the direction of fluid flow as indicated by the arrow 50 such that the tubing 40 is wedged tightly against an inside surface of the nut portion 36.

More particularly, as illustrated in FIGS. 2 and 3, the body portion 32, in addition to the threaded portion 42 includes a threaded portion 52 which is used to thread the body portion into a suitable receptor. It will be appreciated that the portion 52 may take on other configurations depending on the nature of the use. Furthermore, the body portion 32 is illustrated as including a collar portion 54 positioned between the threaded portions 42,52 which has a hexagonal outer configuration. If necessary, in certain applications, the collar portion 54 may be gripped by a wrench or the like when threading the body of the fitting into a receptacle or into the nut portion 36. Preferably, as illustrated in FIGS. 2 and 3, the bore 34 of the fitting body 32 has an inside diameter which approximates that of the tubing inside diameter.

The tubular end portion 46 of the fitting body portion 32 includes a radially outwardly projecting flange 56 at the downstream end thereof. The flange 56, which extends circumferentially about the tubular end, is tapered so as to have a smaller diameter at the downstream end than at the upstream end. This configuration assists in the insertion of the tubular portion 46 into the tubing 40. Furthermore, the flange 56 defines a generally radially extending surface 58 which engages the collar member 48 so as to retain the collar member 48 on the tubular end portion 46 when a pull is exerted on the tubing 40.

Furthermore, as illustrated in FIGS. 2 and 3, the tubular end portion 46 of the fitting body 32 has a lesser outside diameter than the adjacent threaded portion 42 such that a generally radially extending surface 60 is defined which limits the upstream movement of the collar member 48. The two radially extending surfaces 58 and 60 cooperate to limit the axial movement of the collar member 48.

As further illustrated in FIGS. 2 and 3, the collar member 48 has an outside diameter which becomes progressively less from the upstream end to the downstream end such that the collar 48 has a generally wedge-shaped cross section with an outer surface 62 being inclined or oblique with respect to the longitudinal axis of the fitting. The collar member 48 has an inside diameter which is slightly larger than the outside diameter of the tubular end portion 46 such that the collar member 48 freely slides on the tubular end portion 46 with little resistance. Furthermore, the outside diameter of the collar member 48 is less than the inside diameter of the nut threaded portion 44 such that there is sufficient space allowance for the nut portion 36 to be threaded over the tubing 40 onto the threaded portion 42.

The tubular end portion 46 has a greater axial extent between the radially extending surfaces 58 and 60 than the axial extent of the collar member 48. This enables reciprocating axial movement by the collar member 48 between the radially extending surfaces 58 and 60.

As further illustrated in FIGS. 2 and 3, the nut portion 36 includes a inwardly extending shoulder portion 64 defining an inside diameter which is less than the inside diameter defined by the threaded portion 44. Interconnecting the inside surface of the threaded portion 44 and an inside surface 67 of the shoulder portion 64 of the nut 36 is a substantially radially extending surface 66. As illustrated in FIGS. 2 and 3, the surface 66 is preferably located upstream from the radially extending surface 58 when the nut 36 is threaded onto the body portion 32. The inside diameter of the shoulder portion 64, defined by the surface 67 which in the preferred embodiment illustrated is generally parallel to the longitudinal axis of the fitting, is greater than the outside diameter of the upstream end of the flange 56. However, as illustrated in FIGS. 2 and 3, preferably the radial distance between the outside surface of the flange 56 and the inside surface 67 of the shoulder portion 64 is less than the thickness of the tubing 40 such that the tubing 40 is compressed thereby so as to bulge into a cavity 68 above the tubing and a cavity 70 immediately below the tubing when the nut is threaded onto the body 32. Consequently, the tubing 40 is compressed and wedged against the radially extending surfaces 66 and 59 when the nut is attached so as to form a fluid tight seal.

The surfaces 66 and 67 of the shoulder portion 64 are interconnected to form a relatively sharp edge 69. As illustrated in FIGS. 2 and 3, the edge 69 grips the outer surface of the tubing 40 so as to aid in preventing the tubing 40 from slipping out of the fitting.

As illustrated in FIG. 3, when a tensile pull is exerted on the tubing 40 by a fluid flow, generally indicated by the arrow 50, or by an external pulling on the tubing, the thickness or cross section of the tubing 40 is reduced resulting in the tubing moving in the downstream direction. As the tubing moves, the collar member 48 axially slides along the tubular portion 46 due to the friction between the outer surface 62 of the collar member 48 and the inner surface of the tubing 40. As the collar member 48 moves downstream, it forces the tubing 40 out of the cavity 70 and forces more of the tubing 40 into the cavity 68 providing a dynamic sealing wedge between the shoulder portion 64 and the tubing 40. The more the tubing 40 is pulled, the tighter the collar member 48 wedges the tubing 40 against the radially extending surface 66 of the shoulder portion 64, thereby preventing the tubing 40 from being pulled out of the fitting.

Figure 7:
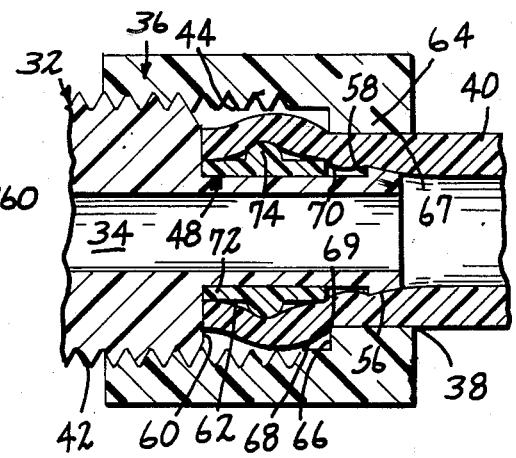
FIG. 7 is a cross sectional view of still another embodiment of the present invention.
Figure 8:
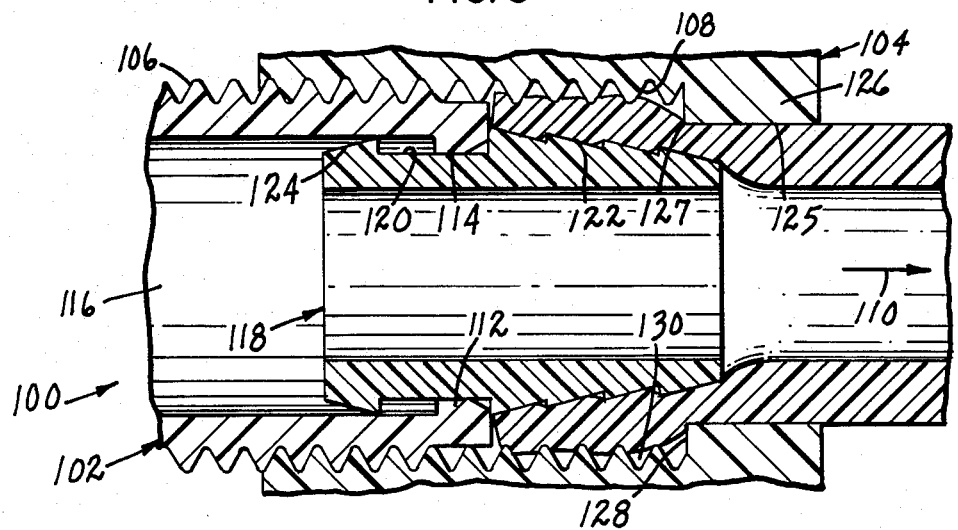
FIG. 8 is a cross sectional view of yet another embodiment of the present invention.

As illustrated is FIG. 3, the collar member 48 preferably is a wedge-shaped member, although other configurations may be utilized. For example, illustrated in FIG. 7 is an alternate embodiment wherein the collar member 48 includes an axially slidable sleeve portion 72 with a radially extending projection 74 about the circumference thereof. Somewhat similar to the action of the wedge-shaped collar member 48, the collar portion 74 wedges the tubing 40 against the radially extending surface 66 of the nut portion 64 when the tubing is pulled on. Preferably, the wedge-shaped collar member illustrated in FIG. 3, forms an angle of intersection with the longitudinal axis of the fitting which is approximately five to nine degrees and most preferably approximately seven degrees.

As previously mentioned, there must be sufficient friction between the inside surface of the tubing 40 and the outer surface 62 of the collar member 48 such that the collar member 48 axially slides with the tubing 40 when a tensile pull is exerted on the tubing.

Figure 4:
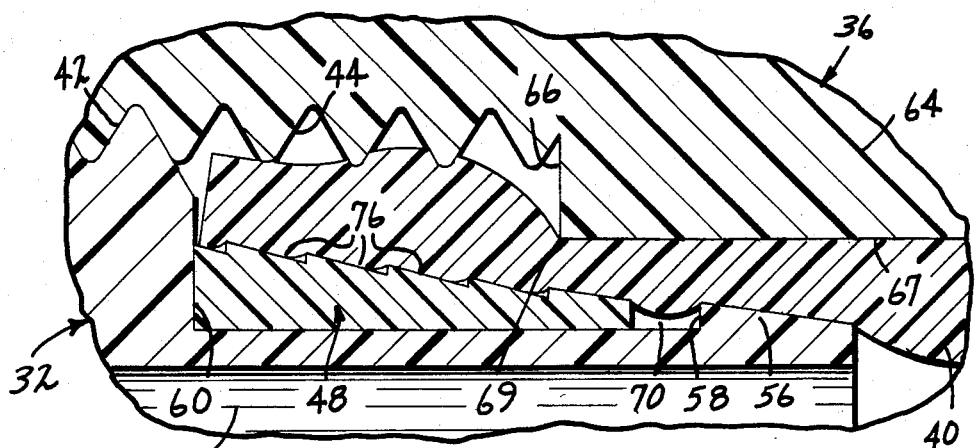
FIG. 4 is a fragmentary enlarged cross sectional view of an alternate embodiment of the present invention.

Illustrated in FIG. 4 is yet another embodiment of the present invention. In this embodiment, the collar member 48 includes a plurality of serrations 76 on the outer surface thereof. The serrations 76 form a plurality of sharp edges and radially extending surfaces for engaging the inside surface of the tubing 40 so as to provide for additional friction between the tubing 40 and the collar member 48.

While the preferred embodiment of the present invention defines a generally radially extending surface 66 at the shoulder portion 64 so as to provide the greatest wedging effect, the surface 66 might also be oblique with respect to the longitudinal axis of the fitting. The steeper the incline of the surface 66, the greater the wedging effect. Furthermore, the sharp edge 69 at the junction of the surfaces 66,67 aids in gripping the tubing 40 to prevent the tubing from sliding out of the fitting.

The inside surface 67 of the shoulder portions 64 in cooperation with the flange 56, compresses the tubing 40 when the nut portion 36 is threaded into the body portion 32. Consequently, the shoulder portion 64 provides a positive support collar which effectuates a fluid-tight seal in conjunction with the flange 56 of the tubular end portion 46.

Figure 5:
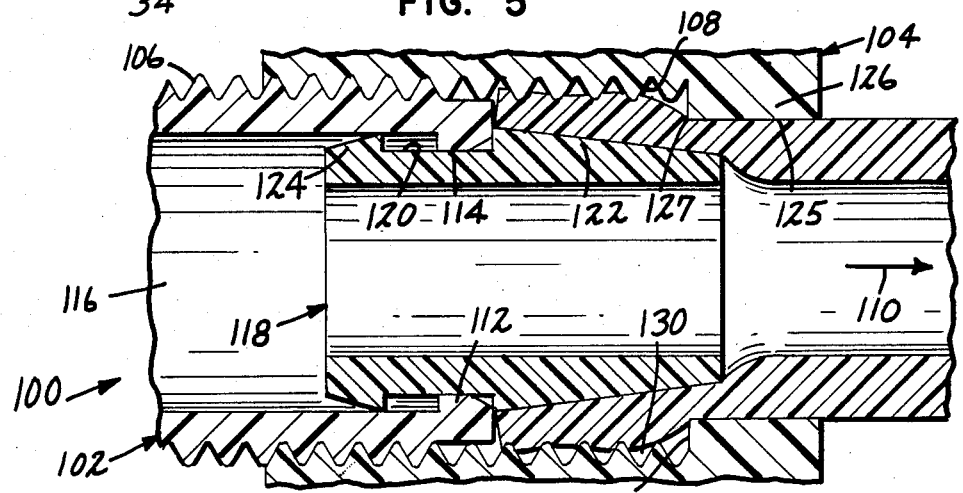
FIG. 5 is a cross sectional view of yet another embodiment of the present invention.

Illustrated in FIG. 5 is yet another embodiment of the present invention generally designated by the reference numeral 100. As generally with the preferred embodiment, the fitting apparatus 100 includes a body 102 and nut 104 which are threaded together at threaded portions 106,108. Both the body 102 and nut 104 define a path for the flow of fluid therethrough. At the downstream end of the fitting body 102, the fluid direction being generally indicated by an arrow 110, is a radially inwardly projecting collar 112 defining a bore 114 of lesser diameter than a bore 116 defined by the fitting body 102. The inner surface of the collar 112 functions as a guide surface for a sleevelike member 118 projecting from the fitting body 102 and slideably mounted for axial movement of the fitting. The sleevelike member 118 has an indentation about the circumference thereof defining an outer surface 120 which slidingly engages the inner surface of the collar 112. The outer surface 120 of the indentation is bounded both on the downstream and the upstream side by tapered portions 122,124 having a generally wedge-shaped cross section. Each of the tapered portions 122,124 have their largest outside diameter adjacent the indentation surface 120 so as to limit the axial movement of the sleevelike member 118 in either the downstream or the upstream direction by engaging the collar 112.

The outer surface of the downstream end of the tapered portion 122 cooperates with an inner surface 125 of a radially inwardly projecting shoulder 126 of the nut 104 to compress the tubing 40 when the nut 104 is threaded onto the body 102. Furthermore, the inner surface 125 of the collar portion 126 defines a bore of lesser diameter than defined by the threaded portion 108, the two portions being interconnected by a generally radially extending wall or surface 128. The intersection of the surfaces 125 and 128 defines a sharp edge 127 which assists in gripping the tubing 40.

Consequently, as illustrated in FIG. 5, when the fitting nut 104 is threaded onto the fitting body 102, the tubing 40 is compressed between the outer surface of the tapered portion 122 and the inner surface 125 of the collar portion 126 such that the tubing 40 bulges into a cavity 130 between the threaded portion 108 and the tubing 40. When a tensile pull is exerted on the tubing 40 either due to pressure inside the tubing or the tubing physically being pulled, the sleevelike member 118 axially slides in a downstream direction due to the movement of the tubing 40. As it moves in the downstream direction, the tapered portion 122 forces more of the tubing 40 into the cavity 130 thereby further wedging the tubing into the radially extending wall 128. Accordingly, a dynamic sealing wedge between the fitting nut 104 and the tubing 40 is created. The more the tubing 40 is pulled, the tighter the axially slideable sleevelike member 118 wedges the tubing 40 into the radially extending wall 128.

Figure 6:
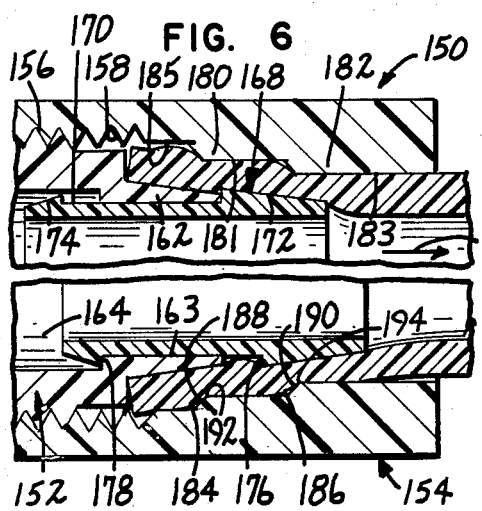
FIG. 6 is a cross sectional view of yet another embodiment of the present invention.

Illustrated in FIG. 6 is yet another embodiment of the present invention as generally designated by the reference numeral 150. The fitting apparatus includes a body 152 and nut 154, the fitting body and nut 152,154 include threaded portions 156,158 adapted for cooperating with one another such that the fitting nut 154 can be threaded onto the fitting body 152. The flow of the fluid through the coupling is generally indicated by an arrow 160. The fitting body 152 includes an extension 162 at the downstream end thereof having an inclined outer surface so as to provide the extension with a generally conical configuration. The extension 162 has a greater outer diameter at the upstream end than at the downstream end. Furthermore, the extension 162 defines a bore 163 of lesser diameter than an adjacent bore 164 defined by the body 152. Slideably mounted in the extension 162 for axial movement thereof is a sleevelike member 168. The sleevelike member defines an indentation 170 about the circumference thereof which has a greater longitudinal extent than the extension 162 such that the sleevelike member 168 is capable of reciprocating axial movement. Positioned on either side of the indentation are conical shaped portions 172,174 which limit the axial movement of the sleevelike member 168 by providing radially extending surfaces 176 and 178 which engage the extension 162 after a predetermined axial movement. The fitting nut 104 includes two radially inwardly extending collar portions 180,182 defining bores 181,183 respectively, on the inside of the nut 154 which are less in diameter than a bore 185 defined by the threaded portion 158.

The bore 183 defined by the collar portion 182, which is positioned downstream from the collar portion 180, has a lesser diameter than the bore 181 defined by the collar portion 180. When the fitting nut 104 is threaded onto the fitting body 102, the collar portions 180,182 cooperate with the conical portion 172 to compress the tubing 40 and provide a fluid tight seal. As illustrated in FIG. 6, the tubing on the upstream side of the collar portions 180,182 is forced into cavities 184,186. As tensile pull is exerted on the tubing 40, the tubing 40 has a tendency to move in the downstream direction. As it does, the sleevelike member 168 axially moves therewith. As the conical portion 172 moves downstream, its wedge-like configuration causes more of the tubing 40 to be forced into the cavities 184 and 186. Consequently, the more the tubing 40 is pulled, the greater the wedging effect between the tubing and shoulder portions 188,190 defined by the collar portions 180,182. The shoulder 190 functions as primary wedge point as it is generally in radial alignment with the conical portion 172 so as to more greatly compress the tubing 40 than the shoulder 188. The conical extension 162 also somewhat assists in the gripping process by forcing the tubing 40 radially outward generally against the shoulder 188. Although the shoulders 188,190 are illustrated as generally defining surfaces oblique with respect to the longitudinal axis of the fitting, greater wedging action is obtained if the shoulders 188,190 are perpendicular to the longitudinal axis. Furthermore, as with the other embodiments, the collar portions 180,182 are illustrated as defining sharp corner edges 192,194 to assist in gripping the tubing.

In use, the present invention is readily and easily installed. While use of the preferred embodiment 30 is hereafter described, it will be appreciated that other embodiments of the present invention are similarly used. The fitting nut 36 is inserted over the end of the tubing 40. The tubing 40 is then inserted onto the tubular portion 46 of the fitting body 32. The radially extending surface 60 limits the extent which the tubing 40 may be inserted onto the fitting body 32. The fitting nut 36 is then threaded onto the threaded portion 42 of the fitting body 32. In some applications, this may be accomplished, without the use of any tools, simply by finger tightening of the fitting. It will be appreciated, that the fitting body 32 may then be attached to another type of tubing, adapter, etc.

The present invention thus provides a fitting for flexible, soft tubing which provides a fluid-tight seal even when tensile pull is not exerted on the tubing and which provides a dynamic sealing wedge effect between the fitting nut 36 and the tubing 40. This is accomplished by the axially slideable member 48 which wedges the tubing into the holding wall or surface 66 of the fitting nut 36. Therefore, the more the tubing is pulled, the tighter the mandrel wedges the tubing so as to provide a strong hold on the tubing and prevent the tubing from being pulled out of the fitting.

Furthermore, the present invention is easily and inexpensively manufactured. The structure thereof lends itself to injection molding processes as there are few working parts with a relatively uncomplicated structure.

In addition, the present invention is easy to use and frequently does not require the use of any additional tools. Therefore, the present invention can be utilized even where there are severe space constraints and requires a minimum amount of time to install.

Also, the present invention lends itself to miniaturization as it provides an increased gripping effect and a fluid-tight seal while maximizing the amount of fluid flow therethrough.

It should be understood, however, that even though these numerous characteristics and advantages of the invention have been set forth in the foregoing description, together with details of the structure and function of the invention, the disclosure is illustrative only, and changes may be made in detail, especially in matters of shape, size and arrangement of parts within the principal of the invention to the full extent indicated by the broad general meaning of the terms in which the appended claims are expressed.

What is claimed is:

1. A fitting for use withe soft tubing, comprising:
   (a) a female member defining an aperture for insertion therethrough of a tubing, said female member having a threaded portion;
   (b) a male member defining a tubular portion adapted for insertion into the tubing, said male member including radially extending flange means for preventing the insertion of said tubular portion into the tubing beyond a predetermined distance, said male member including a threaded portion adapted for cooperation with the threaded portion of said female member;
   (c) a collar portion slideably mounted on said tubular portion for axial movement on said tubular portion, said collar portion being adapted for insertion at least partially into the tubing; and
   (d) a generally radially inwardly projecting collar portion of said female member engaging the outer surface of the tubing, said collar portion of said female member cooperating with said axially slideable collar portion of said male member to retain the tubing in the fitting when a tensile pull is exerted thereon.

2. A fitting apparatus in accordance with claim 1, wherein said tubular portion includes means for retaining said axially slideable collar portion on said tubular portion.

3. A fitting apparatus in accordance with claim 1, wherein said axially slideable collar portion defines a surface substantially parallel to the longitudinal axis of the fitting.

4. A fitting apparatus in accordance with claim 1, wherein said axially slideable collar portion has an inclined outer surface which lies in a plane generally oblique with respect to the longitudinal axis of the fitting.

5. A fitting apparatus in accordance with claim 4, wherein the outer surface of said axially slideable collar portion tapers from a maximum diameter at the end closest the threaded portion to a minimum diameter at the end inserted farthest into the tubing.

6. A fitting apparatus in accordance with claim 5, wherein the angle of said tapered surface is approximately seven degrees.

7. A fitting apparatus in accordance with claim 1, wherein said collar portion of said female member includes a generally sharp edge portion for gripping the tubing.

8. A fitting apparatus in accordance with claim 1, wherein said axially slideable collar portion is generally wedge-shaped and includes a plurality of serrations on the outer surface thereof.

9. A fitting apparatus in accordance with claim 1, wherein said axially slideable collar portion is a sleevelike member including a radially projecting protrusion on the outside surface thereof, said protrusion engaging the inside surface of the tubing and cooperating with the collar portion of the male member to retain the tubing in the fitting.

10. A fitting apparatus in accordance with claim 1, wherein the collar portion of said female member defines a radially extending surface, said surface cooperating with said axially slideable collar portion to retain the tubing on said tubular portion.

11. A fitting apparatus in accordance with claim 1, wherein the collar portion of said female member defines a surface oblique with respect to the longitudinal axis of the fitting, said surface cooperating with said axially slideably collar portion to retain the tubing on said tubular portion.

12. A fitting apparatus in accordance with claim 11, wherein the inside wall of the female member defines a second surface spaced from said first oblique surface which is also generally oblique with respect to the longitudinal axis of the fitting.

13. A fitting apparatus in accordance with claim 10, wherein the inside wall of said female member defines a second radially extending surface spaced from the first radially extending surface.

14. A fitting for use with soft tubing, comprising:
   (a) a nut portion defining an aperture for insertion therethrough of a tubing, said nut portion having a threaded portion;
   (b) a body portion defining a path for the flow of fluid therethrough and including an axially slideable sleevelike member projecting from a first end of said body portion, said axially slideable sleevelike member being supported in said body portion by an inwardly projecting collar portion, said axially slideable sleevelike member including means cooperating with said body portion for limiting the axial movement of said axially slideable sleevelike member between first and second axial positions, said axially slideable sleevelike member being adapted for insertion at least partially into the tubing, said body portion including a threaded portion adapted for cooperation with the threaded portion of said nut portion; and (c) said nut portion having a radially inwardly projecting collar portion for engaging the outer surface of the tubing, said collar portion of said nut portion cooperating with said axially slideable sleevelike member to retain the tubing in the fitting when a tensile pull is exerted on the tubing.

15. A fitting apparatus in accordance with claim 14, wherein said radially inwardly projecting collar portion of said nut portion has a radially extending surface and an axially extending surface, said surfaces cooperating to form a relatively shaped corner portion at the intersection thereof, said axially slideable sleevelike member cooperating with said corner portion to facilitate retention of the tubing in the fitting.

16. A fitting apparatus in accordance with claim 14, wherein said axially slideable sleevelike member includes an inclined outer surface with a plurality of serrations for engaging the inside surface of the tubing.

17. A fitting for use with soft tubing, comprising:
   (a) a nut portion defining an aperture for insertion therethrough of a tubing;
   (b) a body portion defining a path for the flow of fluid therethrough and adapted for releaseable connection to said nut portion, said body portion including axially slideable means interconnected to said body portion so as to be integral therewith, said axially slideable means being supported by said body portion for axial movement and further including means cooperating with said body portion to limit axial movement of said axially slideable means between first and second positions, said axially slideable means being adapted for at least partial insertion into the tubing; and
   (c) said nut portion including an inner surface portion cooperating with said axially slideable means to retain the tubing in the fitting.

* * * * *

UNITED STATES PATENT AND TRADEMARK OFFICE
CERTIFICATE OF CORRECTION

PATENT NO. : 4,500,118
DATED : February 19, 1985
INVENTOR(S) : Brian J. Blenkush It is certified that error appears in the above-identified patent and that said Letters Patent is hereby corrected as shown below:

Column 2, line 55, "extend" should be --extent--;

Column 3, line 17, "slideably" should be --slideable--;

Column 6, line 13, "59" should be --58--;

Column 9, line 49, "withe" should be --with--;

Column 10, line 49, "slideably" should be --slideable--.

Signed and Sealed this

Seventeenth Day of June 1986

[SEAL]

Attest:

DONALD J. QUIGG

*Attesting Officer*   *Commissioner of Patents and Trademarks*